(12) United States Patent
Uchida

(10) Patent No.: US 6,724,760 B2
(45) Date of Patent: *Apr. 20, 2004

(54) ATM SWITCH

(75) Inventor: Yoshihiro Uchida, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,742

(22) Filed: Mar. 18, 1998

(65) Prior Publication Data

US 2002/0110127 A1 Aug. 15, 2002

(30) Foreign Application Priority Data

Aug. 6, 1997 (JP) .............................. 9-212058

(51) Int. Cl.[7] .............................................. H04L 12/56
(52) U.S. Cl. .................. 370/390; 370/395.1; 370/395.3
(58) Field of Search ................................ 370/390, 395, 370/370, 371, 374, 381, 388, 378, 395.1, 395.3, 392, 393

(56) References Cited

U.S. PATENT DOCUMENTS 5,276,425 A  *  1/1994  Swanson et al. ............ 370/390
5,367,520 A  *  11/1994 Cordell ........................ 370/395
5,404,352 A  *  4/1995  Pauwels et al. ............. 370/390
5,438,566 A  *  8/1995  Masetti et al. .............. 370/355
5,461,615 A  *  10/1995 Henrion ....................... 370/395
5,557,621 A  *  9/1996  Nakano et al. ............. 370/395

FOREIGN PATENT DOCUMENTS

JP          5-336155        12/1993
JP          7-303110        11/1995

* cited by examiner

Primary Examiner—Chau Nguyen
Assistant Examiner—Soon-Dong Hyun
(74) Attorney, Agent, or Firm—Katten Muchin; Zavis Rosenman

(57) ABSTRACT

An ATM switch includes routing modules in each of which modules ATM cells can be switched at crosspoints of inputs and outputs, input units which are respectively provided to input highways and add tags to the ATM cells transferred over the input highways, the tags being used to switch the ATM cells in the routing modules, the ATM cells with the tags added being supplied to the routing modules, and output units which are respectively provided to output highways and multiply the ATM cells supplied from the routing modules to output the ATM cells to the output highways.

5 Claims, 14 Drawing Sheets

TABLe_a

| ADDRESS (IVPI/IVCI) | DATA (START ADDRESS FOR TABLe-b) |
|---|---|
| αβ | m |
| γδ | a |

FIG. 6A
PRIOR ART

TABLa_b

| ADDRESS | DATA | | | |
|---|---|---|---|---|
| | TAG | NVPI | NVCI | NEXT ADDRESS |
| a | b | c | d | e |
| e | f | g | h | i |
| i | j | k | ℓ | EOC |
| m | n | o | p | q |
| q | r | s | t | EOC |
| EOC-1 | | | | |

FIG. 6B
PRIOR ART

ATM SWITCH

BACKGROUND OF THE INVENTION

1. Field of the Invention

The present invention generally relates to an ATM (Asynchronous Transfer Mode) switch, and more particularly to an ATM switch of compact size.

2. Description of the Related Art

The ATM switch technique is the core of the broadband integrated services digital networks (B-ISDN) which has recently been researched and developed. The ATM switch switches ATM cells each having a fixed length in accordance with header information.

The connection services of the ATM switch are mainly grouped into a point-to-point connection and a multicast connection (point-to-multipoint connection). The point-to-point connection provides services so that a connection between two terminals is made via a switch and a communication takes place between these terminals only. The normal telephone services are implemented by the point-to-point connection.

The multicast connection provides services so that a connection is made between one information sending terminal and a plurality of information receiving terminals via a switch. An example of the multicast connection is a CATV service (video on demand) via a network.

There are two types of the conventional multicast connection, namely, a multistage self routing (MSSR) switch having a cell copy function, and a distribution trunk (DTRK) system.

FIG. 1 is a block diagram of a system using the MSSR switch. An MSSR switch 10 includes input highways 11 and 12, output highways 13 and 14, and SRMs (self routing modules) 15, 16, 17 and 18 arranged at crosspoints of the input and output highways. The MSSR switch shown in FIG. 1 is a two-input, two-output structure. FIG. 2 shows a four-input, four-output MSSR switch. The modules SRM located at the crosspoints has a crosspoint ID (CPID) assigned to a respective column of the matrix formation. For example, the crosspoint ID of the modules SRM located at the four crosspoints which cross output highway #1 is 1, and the crosspoint ID of the modules SRM located at the four crosspoints which cross output highway #2 is 2. Similarly, the crosspoint ID of the modules SRM located at the four crosspoints which cross output highway #3 is 3, and the crosspoint ID of the modules SRM located at the four crosspoints which cross output highway #4 is 4.

The ATM cells transferred over the input highways #1–#4 have a tag added to a header, as shown in parts (A) and (B) of FIG. 3. As shown in part (C) of FIG. 3, the tag includes ID numbers CP1, CP2, CP3 and CP4. When the module SRM indicated by the crosspoint ID of 1 is instructed to latch the ATM cells, CP1 is equal to 1. When the module SRM indicated by the crosspoint ID of 1 is instructed not to latch the ATM cells, CP1 is equal to 0. When the CP2, CP3 and CP4 are equal to 1, the modules SRM respectively indicated by the crosspoint IDs CPID2, CPID3 and CPID4 are instructed to latch the ATM cells. When the CP2, CP3 and CP4 are equal to 0, the modules SRM respectively indicated by the crosspoint IDs CPID2, CPID3 and CPID4 are instructed not to latch the ATM cells.

If an ATM cell A transferred over the input highway #3 has the tag in which CP2=CP3=1 and CP1=CP4=0, the ATM cell A is latched in the modules $SRM_{32}$ and $SRM_{33}$ shown in FIG. 2, so that the identical ATM cells A are output to the output highways #2 and #3. Hence, the multicast connection can be made.

FIG. 4 is a block diagram of a system using the DTRK. Line interface devices (LINF) $30_1$–$30_7$ are connected to the input highways and input terminals of ATM switch 32 of an eight-input, eight-output structure. Line interface devices $34_1$–$34_7$ are connected to output terminals of the ATM switch 32 and output highways. The output terminals of the ATM switch 32 are connected to the distribution trunk DTRK 36, which is also connected to the input terminals of the ATM switch 32.

The distribution trunk 36 is configured as shown in FIG. 5. An ATM cell arriving at a terminal 40 is written into a cell buffer 42 and is supplied to a memory controller 44. The memory controller 44 is connected to a central controller (CC) via a CC interface 46. A header memory 48 stores tables a and b as shown in FIGS. 6A and 6B. The tables a and b are supplied to the header memory 48 from the central controller via the memory controller 44. In the table a, an address for the table b corresponding to an address (VPI/VCI) in the ATM header is registered. In each address for the table b, the tag and the address (VPI/VCI) of the new ATM cell and the next address for the table b are stored.

The memory controller 44 determines whether the address located in the header of the ATM cell received via the terminal 40 coincides with the addresses for the table a. If the result is affirmative, the memory controller 44 accesses the table b by one of the addresses for the table B registered in the table a. the memory controller 44 reads the tag and address (VPI/VCI) of the ATM cell, which are then output to the terminal 52 via the selector 50. Subsequently, the memory controller 44 reads the payload of the ATM cell stored in the cell buffer 42 and outputs it to the terminal 52 via the selector 50. If the next address for the table b is registered in the table a (in other words, if the next address is not the EOC (end of cell)), the memory controller 44 reads the tag and address (VPI/VCI) of the ATM cell of the next address. The tag and address are then output to the output terminal 52 via the selector 50. Subsequently, the memory controller 44 reads the payload of the ATM cell stored in the cell buffer 42 and outputs it to the terminal 52 via the selector 50. In the above manner, the ATM cell is copied.

The ATM cell output from the terminal 52 is supplied to the ATM switch 32 shown in FIG. 4. The tag of the ATM cell indicates to which terminal of the ATM switch 32 should be output. By setting the tag of the ATM cell copied using the distribution trunk 36 to be identical to the tag of the ATM cell switched by the ATM switch 32, the identical ATM cells can be distributed to a plurality of line interfaces LINF (#1, #4 and #6 in FIG. 4).

The conventional system using the MSSR switch can copy the ATM cell transferred via an input highway and send copied ATM cells to a plurality of output highways, but cannot send copied ATM cells to a single output highway.

The other conventional system using the DTRK causes a delay due to routing from the ATM switch 32 to the distribution trunk 36. A further delay is caused when the received ATM cell is copied by the distribution trunk 36. There is another problem such that the ATM cell is copied by serially reading the tag and the address for the table b, and thus a connection listed in a last part of the table b (indicated by the tag and address) has a delay larger than that of a connection listed in a beginning part thereof (indicated by the address in the table a). The total delay caused by the above factors may extend a tolerable delay defined by the services. There is yet another problem in that the ATM cell 32 has an increased amount of traffic because the ATM cells output by the distribution trunk 36 pass through the ATM switch 32 and are then sent to the output highways via the line interfaces $34_1$–$34_7$. In this case, the traffic of incoming ATM cells via the line interfaces $30_1$–$30_7$ from the input highways may be restricted.

It may be considerable to provide distribution trunks to the output highways of the system using the MSSR switch so that the ATM cells are copied at the respective output highways. However, the distribution trunks respectively have header memories, and the whole switch may have an increased circuit scale.

SUMMARY OF THE INVENTION

It is a general object of the present invention to provide an ATM switch in which the above disadvantages are eliminated.

A more specific object of the present invention is to provide an ATM switch capable of copying an ATM cell arriving at one input highway and sending copied ATM cells to a plurality of output highways and capable of sending ATM cells obtained by copying an ATM cell at one output highway, while copied ATM cells have a reduced delay of time and the switch has a compact size.

The above objects of the present invention are achieved by an ATM switch comprising: routing modules in each of which modules ATM cells can be switched at crosspoints of inputs and outputs; input units which are respectively provided to input highways and add tags to the ATM cells transferred over the input highways, the tags being used to switch the ATM cells in the routing modules, the ATM cells with the tags added being supplied to the routing modules; and output units which are respectively provided to output highways and multiply the ATM cells supplied from the routing modules to output the ATM cells to the output highways.

The above switch may be configured so that each of the routing modules has a structure in which an ATM cell arrives at one of the inputs can be switched to any of the outputs.

The ATM switch may be configured so that the routing modules refer to predetermined fixed fields of the tags for routing.

The ATM switch may be configured so that a routing carried out by one of the routing modules can be realized by another one of the routing modules.

The ATM switch may be configured so that the routing modules refer to dynamically assigned fields of the tags for routing so that a routing carried out by one of the routing modules can be realized by another one of the routing modules.

BRIEF DESCRIPTION OF THE DRAWINGS

Other objects, features and advantages of the present invention will become more apparent from the following detailed description when read in conjunction with the accompanying drawings, in which:

FIGS. 6A and 6B are diagrams showing tables used in the conventional art;

DESCRIPTION OF THE PREFERRED EMBODIMENTS

Figure 7:
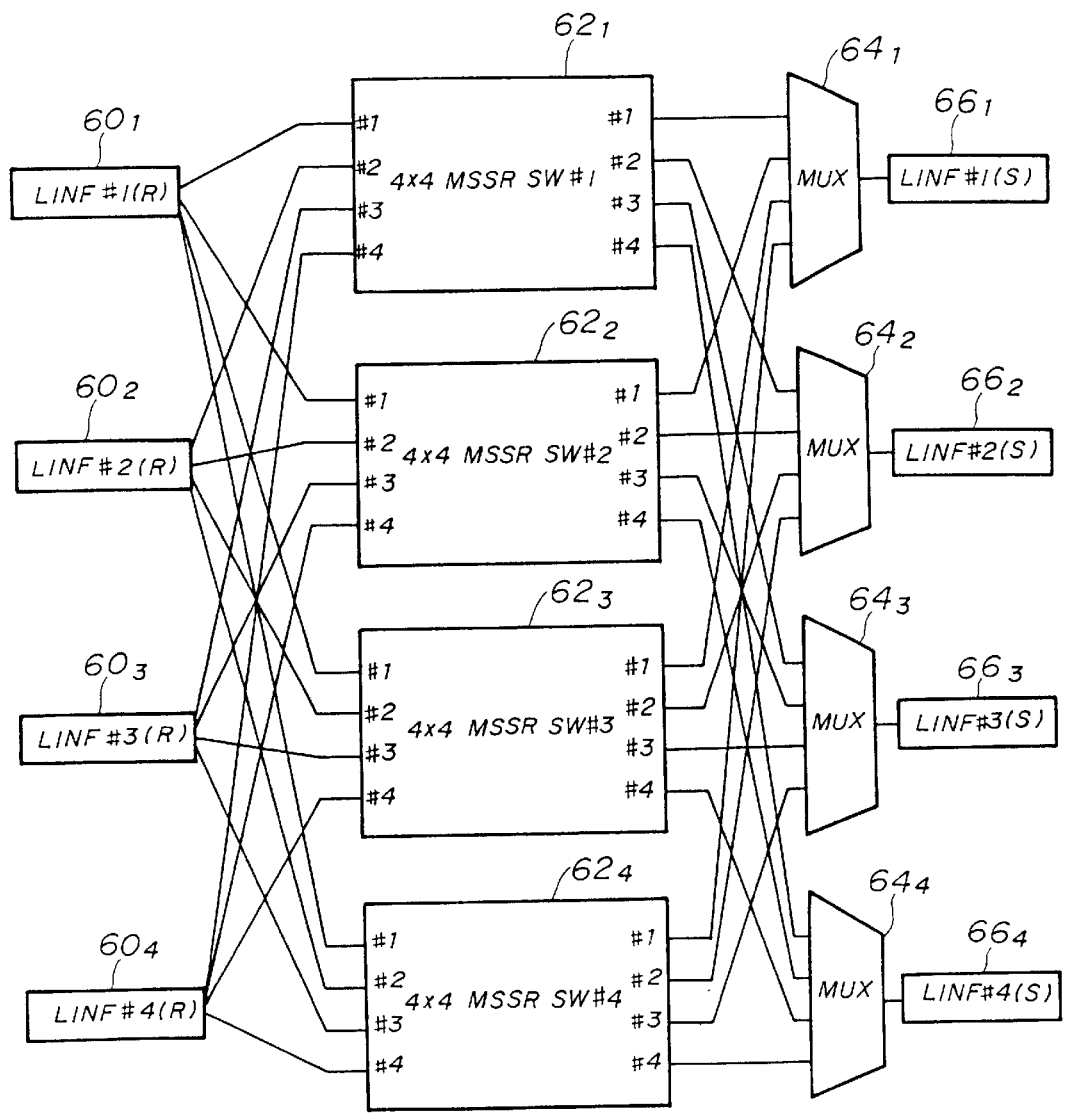
FIG. 7 is a block diagram of an ATM switch according to an embodiment of the present invention.

FIG. 7 is a block diagram of an embodiment of the present invention, which includes an ATM switch of a four-input/four-output structure.

An input part includes line interfaces LINF $60_1$–$60_4$, which are respectively connected to input highways. The line interface $60_1$ (#1) is connected to input highways #1 of respective four-input/four-output MSSR switches (multistage self routing) $62_1$–$62_4$. The line interface $60_2$ (#2) is connected to input highways #2 of the MSSR switches $62_1$–$62_4$. The line interface $60_3$ (#3) is connected to input highways #3 of the MSSR switches $62_1$–$62_4$. The line interface $60_4$ (#4) is connected to input highways #4 of the MSSR switches $62_1$–$62_4$. The MSSR switches $62_1$–$62_4$ distributes ATM cells to highways so that an ATM cell transferred over one input highway is copied and copied ATM cells are output to a plurality of output highways.

The respective output highways #1 of the MSSR switches $62_1$–$62_4$ are connected to a multiplexer (MUX) $64_1$, and the respective output highways #2 of the MSSR switches $62_1$–$62_4$ are connected to a multiplexer $64_2$. The respective output highways #3 of the MSSR switches $62_1$–$62_4$ are connected to a multiplexer $64_3$, and the respective output highways #4 of the MSSR switches $62_1$–$62_4$ are connected to a multiplexer $64_4$. Each of the multiplexers $64_1$–$64_4$ multiplexes ATM cells arriving at the MSSR switches $62_1$–$62_4$. Then the multiplexers $63_1$–$64_4$ output multiplexed ATM cells to the output highways via the line interfaces $66_1$–$66_4$. The multiplexers $64_1$–$64_4$ and the line interfaces $66_1$–$66_4$ form an output part of the ATM switch.

Figure 8:
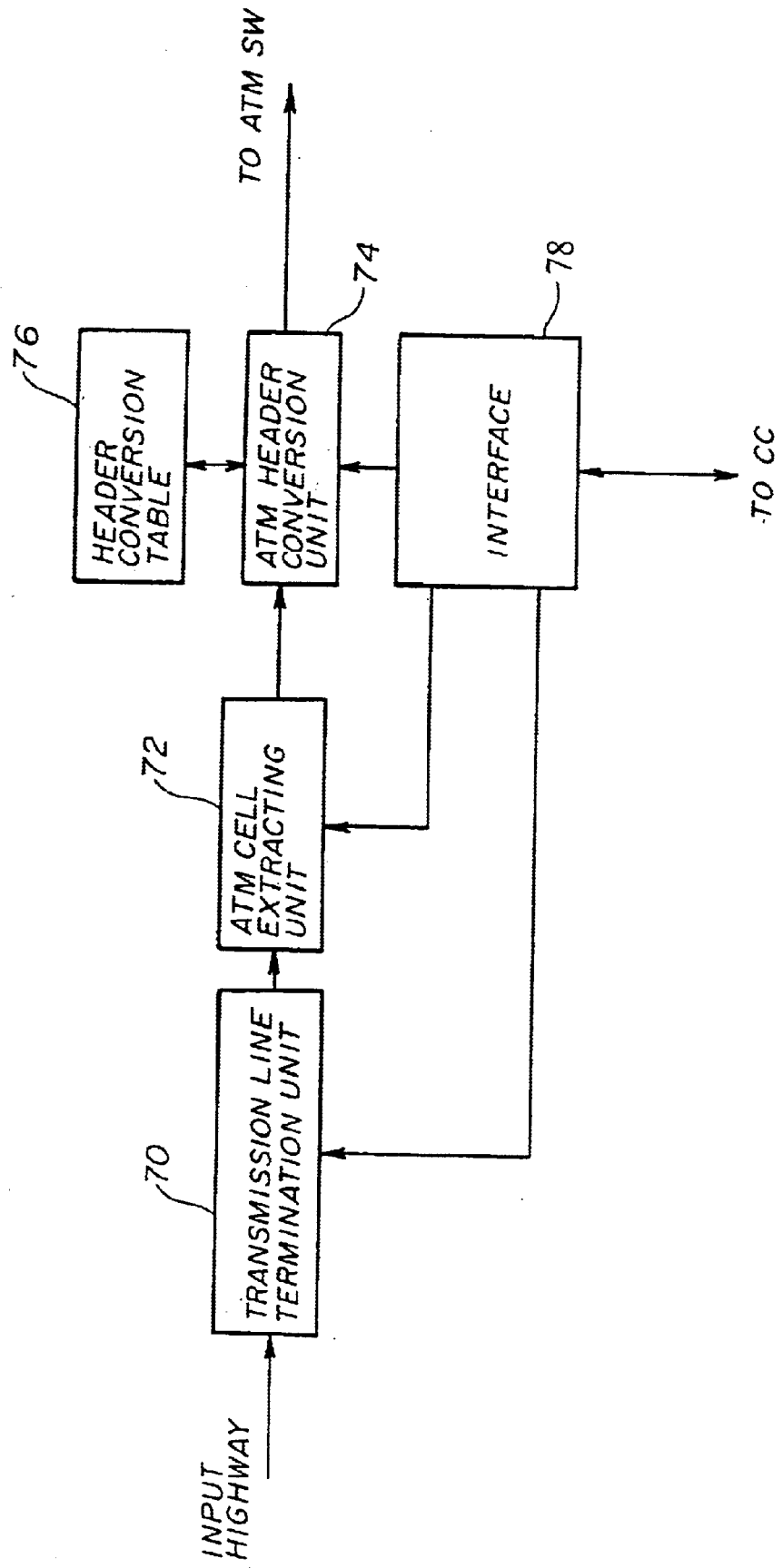
FIG. 8 is a block diagram of an input-side line interface.

FIG. 8 is a block diagram of a structure of each of the line interfaces $60_1$–$60_4$ receiving the ATM cells from the input highways. The corresponding input highway is terminated by a transmission line termination unit 70. The ATM cell transferred via the input highway is supplied to an ATM cell extracting unit 72 via the transmission line termination unit 70, and is extracted therein. The ATM cell extracted is supplied to an ATM header conversion unit 74.

The ATM header conversion unit 74 searches a heater conversion table 76 by using the address (VPI/VCI) of the extracted ATM cell, and obtains the tag and new address (VPI/VCI). Then, the ATM header conversion unit 74 replaces the tag and new address with those of the extracted ATM cell. As shown in part (A) of FIG. 9, the extracted ATM cell consists of the six-octet header and the 48-octet payload.

Figure 9:
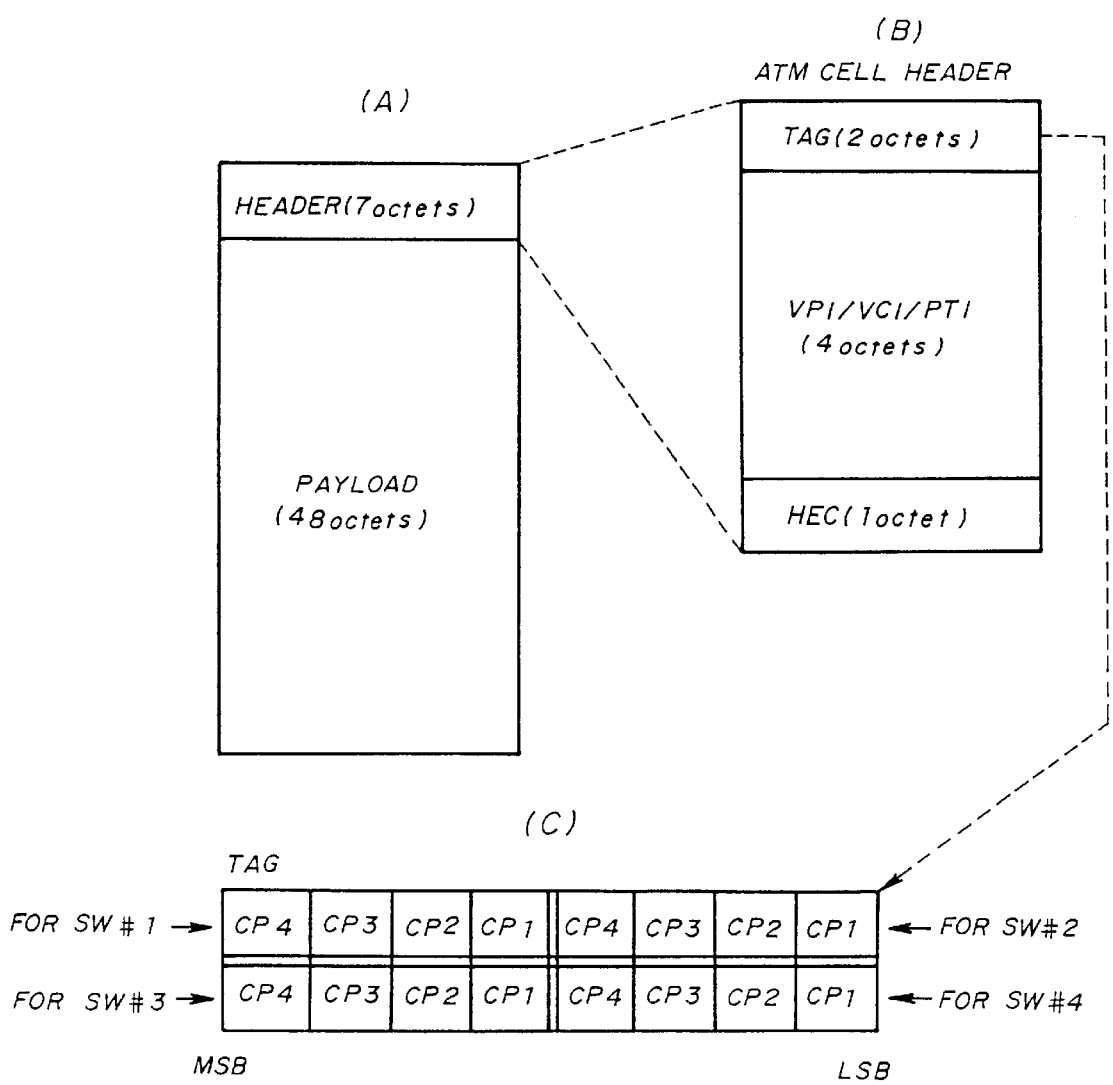
FIG. 9 is a diagram of a tag added to an ATM cell.

By the conversion process of the ATM header conversion unit 74, the two-octet tag is added to the ATM header, as shown in part (B) of FIG. 9. Thus, the ATM header shown in part (B) of FIG. 9 includes four octets consisting of VPI, VCI and PTI (Payload Type Identifier) and one octet of HEC (Header Error Control) in addition to the two-octet tag.

As shown in part (C) of FIG. 9, the first octet of the tag consisting of two octets has four upper bits serving as the identification numbers CP1–CP4 for the MSSR switch $62_1$ (SW#1) and four low bits serving as the identification numbers CP1–CP4 for the MSSR switch $62_2$ (SW#2). The second octet of the tag has four upper bits serving as the identification numbers CP1–CP4 for the MSSR switch $62_3$ (SW#3 and four low bits serving as the identification numbers CP1–CP4 for the MSSR switch $62_4$ (SW#4). The cell length is increased because the two-octet tag is added to the ATM cell. This does not cause any problem by setting the bit rate within the ATM switch to be higher than the outside of the ATM switch.

The contents of the header conversion table 76 can be rewritten by a central controller (CC) coupled thereto via a CC interface 78. The central controller controls the whole ATM switch. The central controller can control, via the CC interface 78, the transmission line termination unit 70, the ATM cell extraction unit 72 and the ATM header conversion unit 74. The ATM cell with the ATM header converted by the ATM header conversion unit 74 is commonly supplied to the MSSR switches $62_1$–$62_4$.

Figure 1:
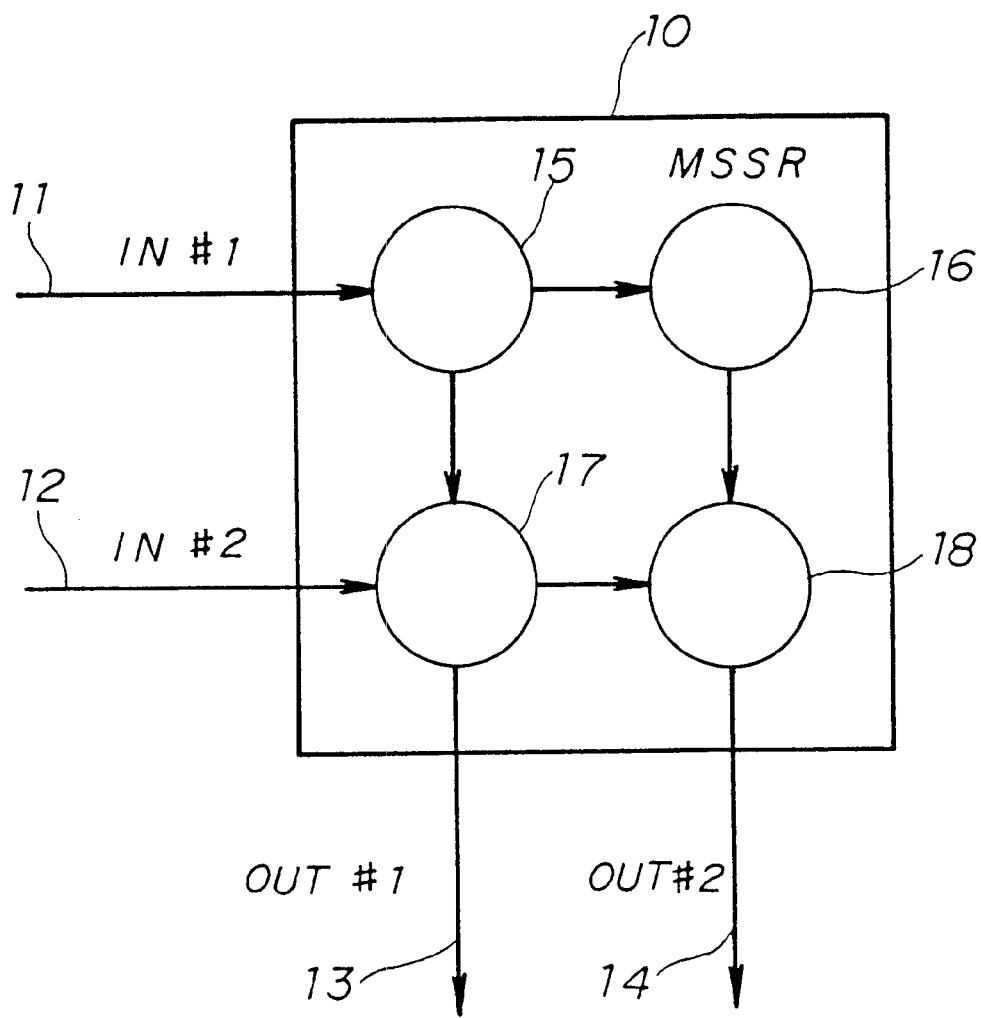
FIG. 1 is a block diagram of an MSSR of a two-input/two-output structure.
Figure 2:
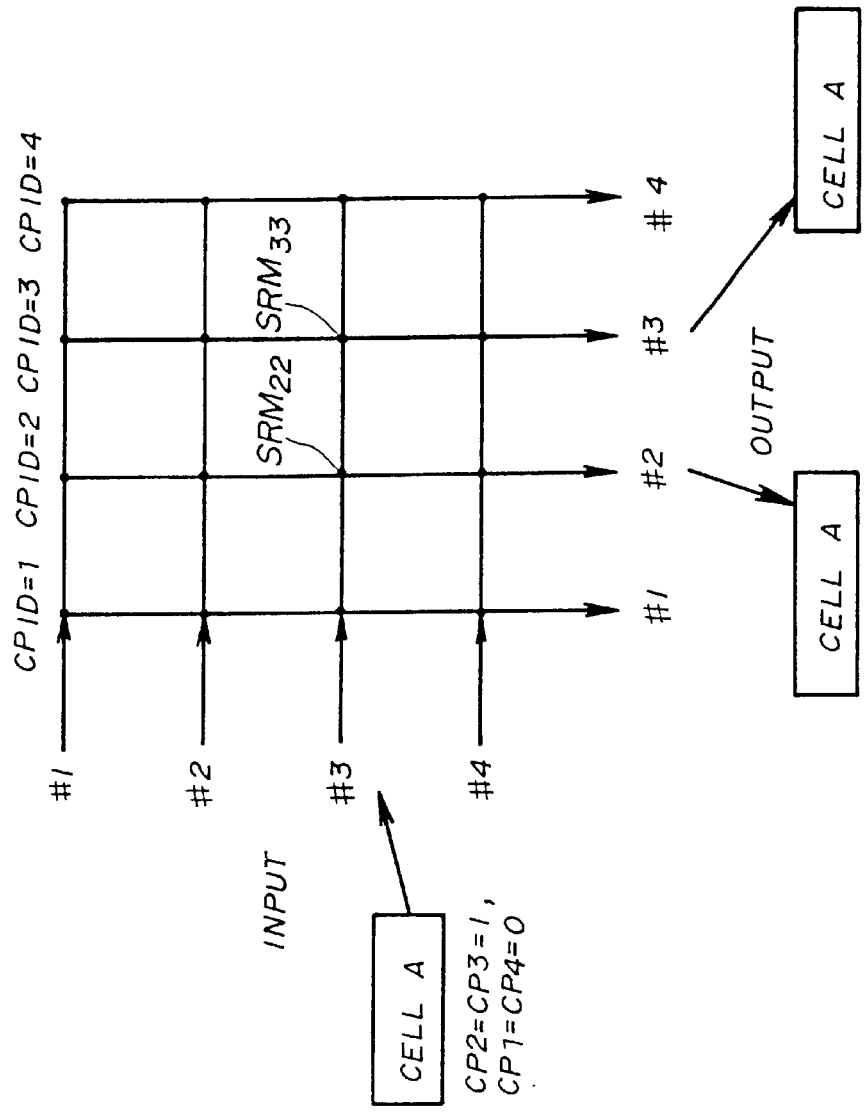
FIG. 2 is a diagram of an MSSR of a four-input/four-output structure.
Figure 3:
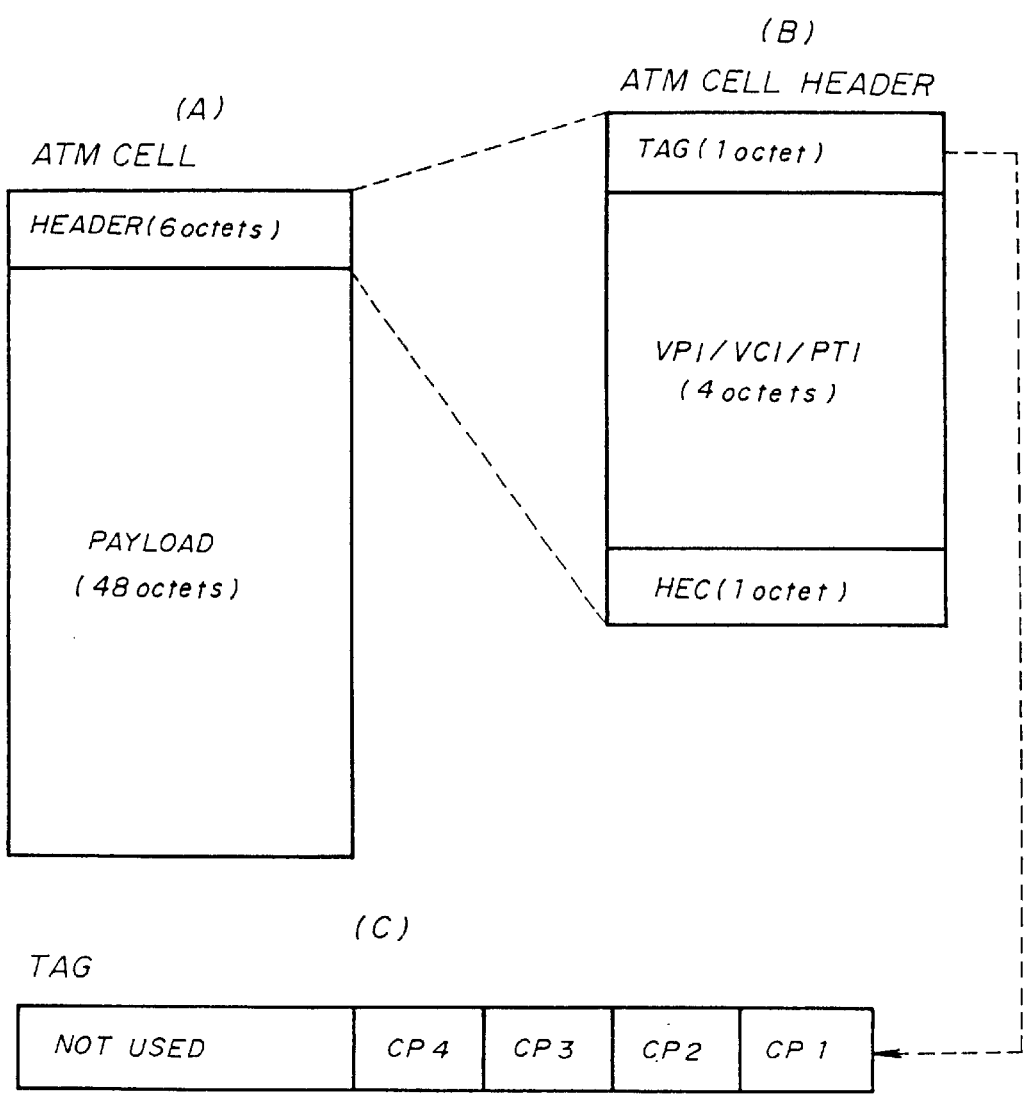
FIG. 3 is a block diagram showing a tag of an ATM cell.
Figure 4:
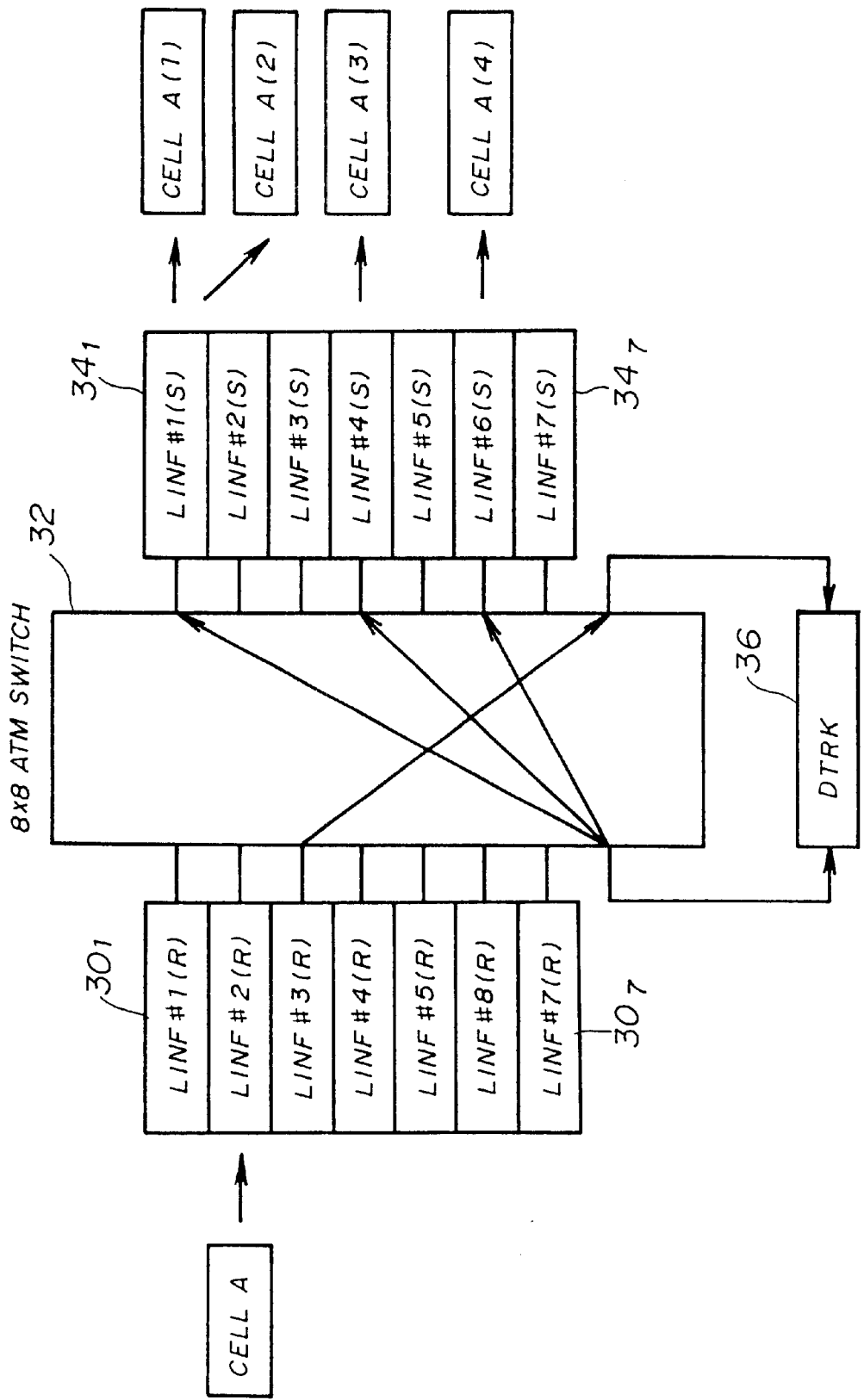
FIG. 4 is a block diagram of a conventional system using a distribution trunk DTRK.
Figure 5:
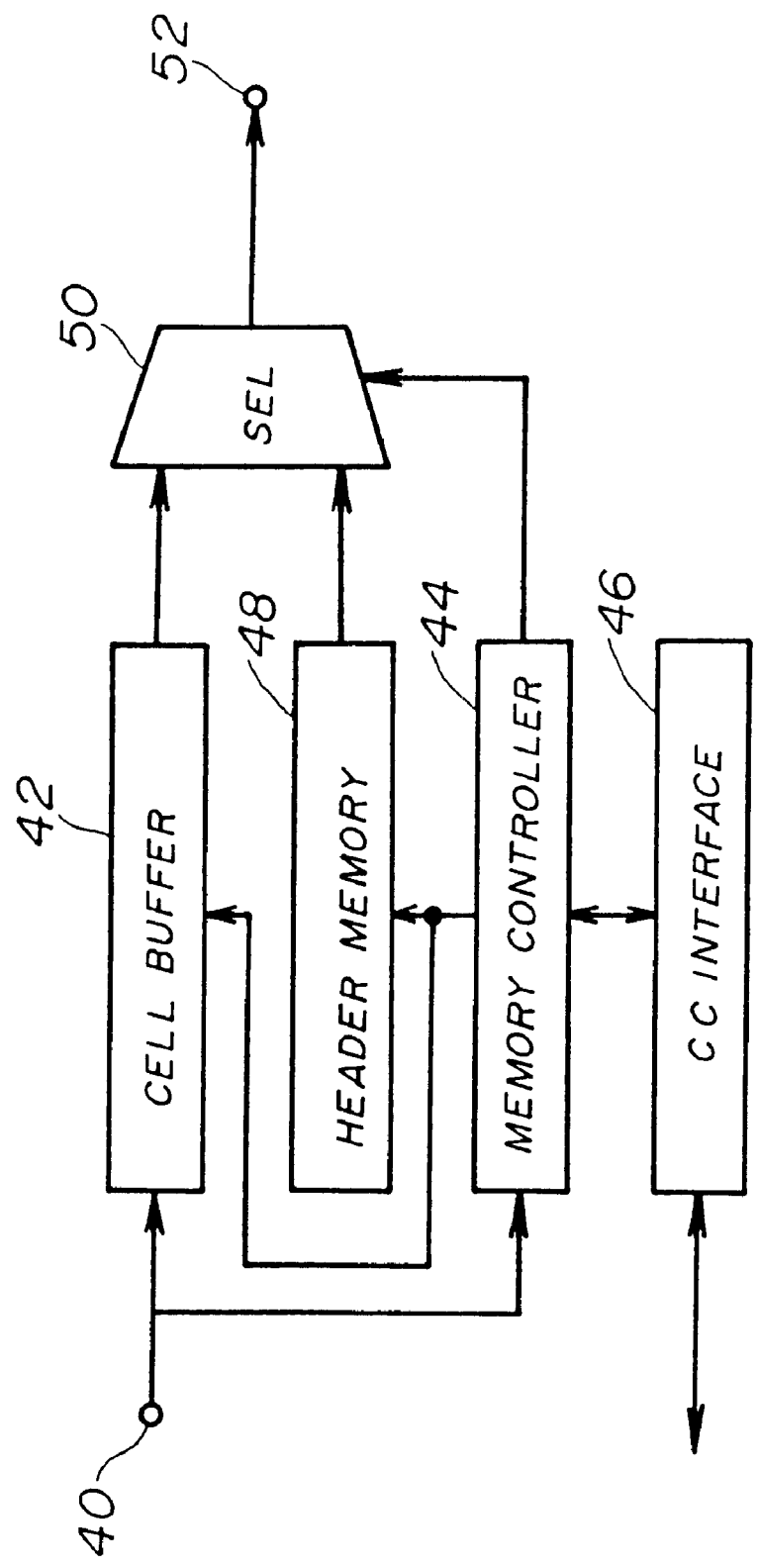
FIG. 5 is a block diagram of the distribution trunk shown in FIG. 4.

The MSSR switches $62_1$–$62_4$ have the same structure as shown in FIG. 2. That is, the self routing modules SRM are arranged at the crosspoints which cross the input highways #1–#4 and the output highways #–#4. As has been described previously, the modules SRM located at the crosspoints has the crosspoint ID (CPID) assigned to a respective column of the matrix formation. For example, the crosspoint ID of the modules SRM located at the four crosspoints which cross output highway #1 is 1, and the crosspoint ID of the modules SRM located at the four crosspoints which cross output highway #2 is 2. Similarly, the crosspoint ID of the modules SRM located at the four crosspoints which cross output highway #3 is 3, and the crosspoint ID of the modules SRM located at the four crosspoints which cross output highway #4 is 4.

Figure 10:
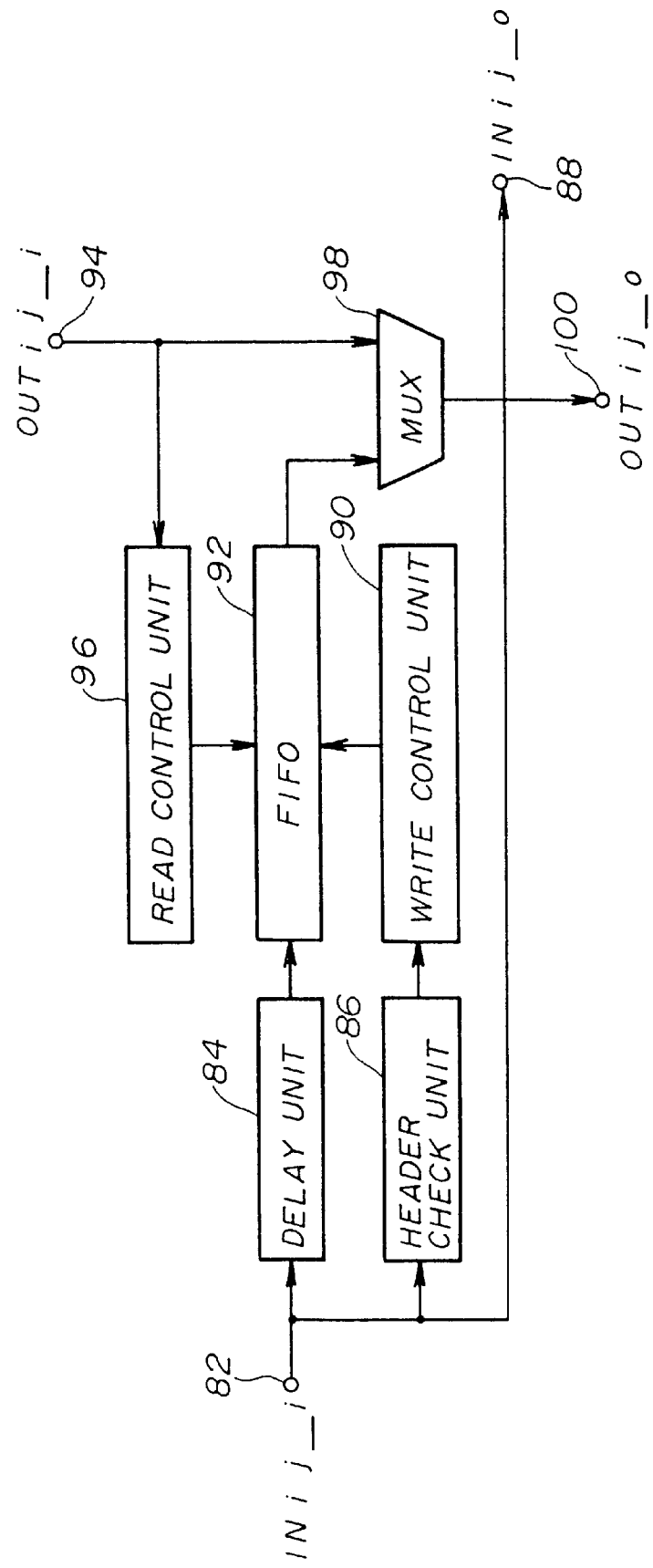
FIG. 10 is a block diagram of a multistage self routing switch.

FIG. 10 is a block diagram of a structure of the self routing modules SRM employed in the MSSR switches $62_1$–$62_4$. It will now be assumed that the self routing module SRM shown in FIG. 10 is arranged at row i and column j. An ATM cell transferred over the input highway #i is received at a terminal 82, and is then applied to a delay unit 84 and a header check unit 86. Further, the above ATM cell is output to the next self routing module SRM via a terminal 88. The header check unit 86 refers to the own crosspoint ID number CPi of the corresponding MSSR switch (any of SW#1, SW#2, SW#3 and SW#4), activates a write control unit 90 only when CPi=1.

The delay unit 84 delays the ATM cell by the time necessary for the check operation of the header check unit 86. The delayed ATM cell is supplied to and written into an FIFO memory 92 under the control of the write control unit 90. An ATM cell output by the self routing module SRM located at row i−1 connected to the output highway #j is applied to a terminal 94, and is then supplied to a read control unit 96 and a multiplexer (MUX) 98. The read control unit 96 operates when no ATM cell arrives at the terminal 94, and reads the ATM cell stored in the FIFO memory 92. The read ATM cell is then supplied to the multiplexer 98. When the ATM cell arrives at the terminal 94, it is output to a terminal 100 via the multiplexer 98. When there is no ATM cell arriving at the terminal 94, the ATM cell read from the FIFO memory 92 is selected by the multiplexer 98, and is applied to the output terminal 100. The ATM cells thus multiplexed are serially supplied to the self routing module SRM located at row i+1, and is finally sent to the output highway #j.

Figure 11:
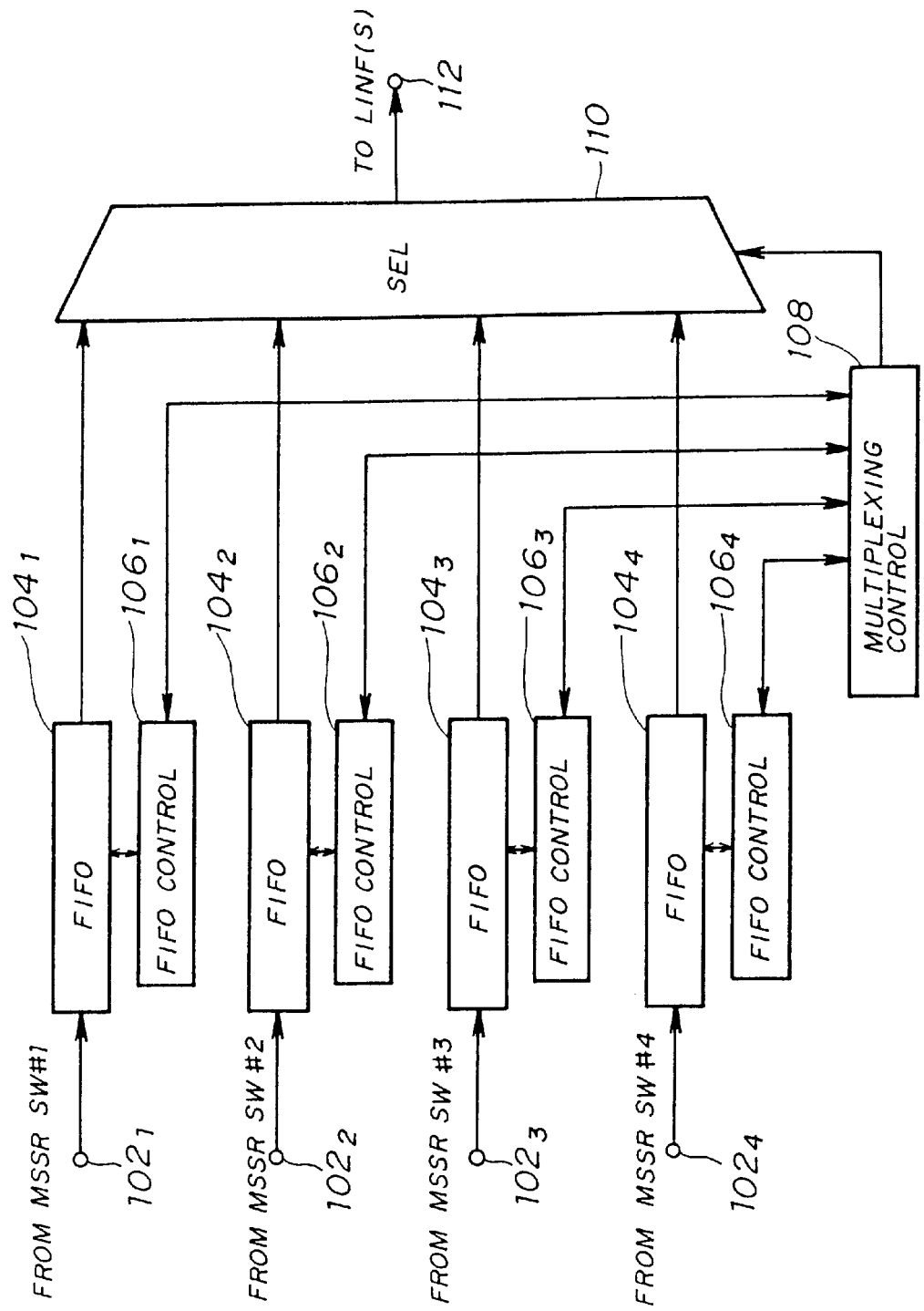
FIG. 11 is a block diagram of a multiplexer.

FIG. 11 is a block diagram of a structure of the multiplexers $64_1$–$64_4$. The ATM cells are supplied to terminals $102$–$102_4$ supplied from the MSSR switches $621$–$62_4$, and are then supplied to the FIFO memories $104_1$–$104_4$. FIFO controllers $106_1$–$106_4$ controls write and read operations of the FIFO memories $104_1$–$104_4$, respectively. More particularly, the FIFO controllers $106_1$–$106_4$ control the FIFO memories $104_1$–$104_4$ when the ATM cells are supplied thereto, and notify a multiplexing control unit 108 of the states of the FIFO memories $104_1$–$104_4$.

The multiplexing control unit 108 performs an arbitration control to prevent the FIFO memories $104_1$–$104_4$ from overflowing, and supplies read permission signals to the FIFO controllers $106_1$–$106_4$. Further, the multiplexing control unit 108 controls switching of a selector (SEL) 110. Each of the FIFO control units $106_1$–$106_4$ receives the read permission signal and performs a read of a respective one of the FIFO memories $104_1$–$104_4$. Thus, the ATM cells read from the FIFO memories $104_1$–$104_4$ in the time series are supplied to the following line interfaces LINF via the selector 110 and a terminal 112.

Figure 12:
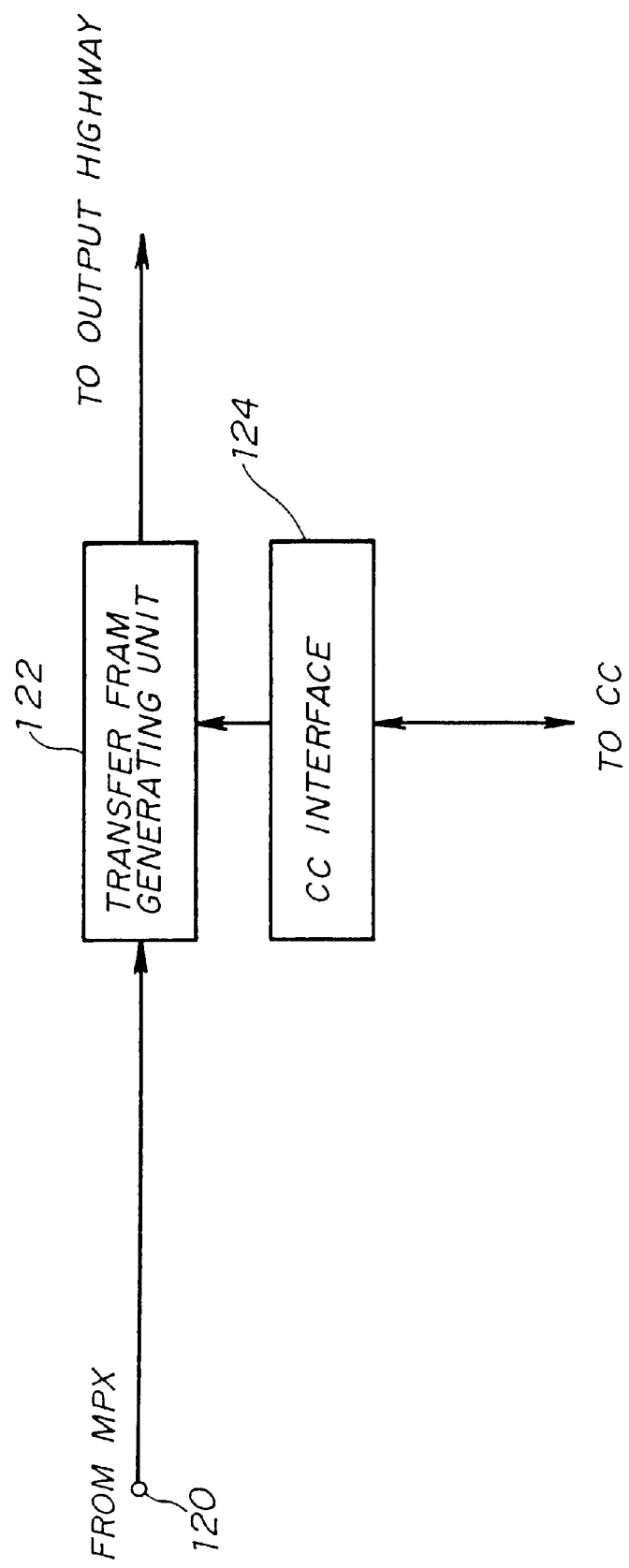
FIG. 12 is a block diagram of an output-side line interface.

FIG. 12 is a block diagram of a structure of the line interfaces $66_1$–$66_4$ via which the ATM cells are supplied to the output highways. The ATM cells from the multiplexers $64_1$–$64_4$ are applied to a terminal 120, and are supplied to a transfer frame generating unit 122. As shown in FIG. 12, the transfer frame generating unit 122 is connected to the central controller via a central controller (CC) interface 124. The transfer frame generating unit 122 removes the tag from the header of the ATM cell supplied thereto, and generates a transfer frame of the ATM cell transferred at a bit rate indicated by the CC interface 124. Then, the ATM cell thus generated is sent to the output highway.

Figure 13:
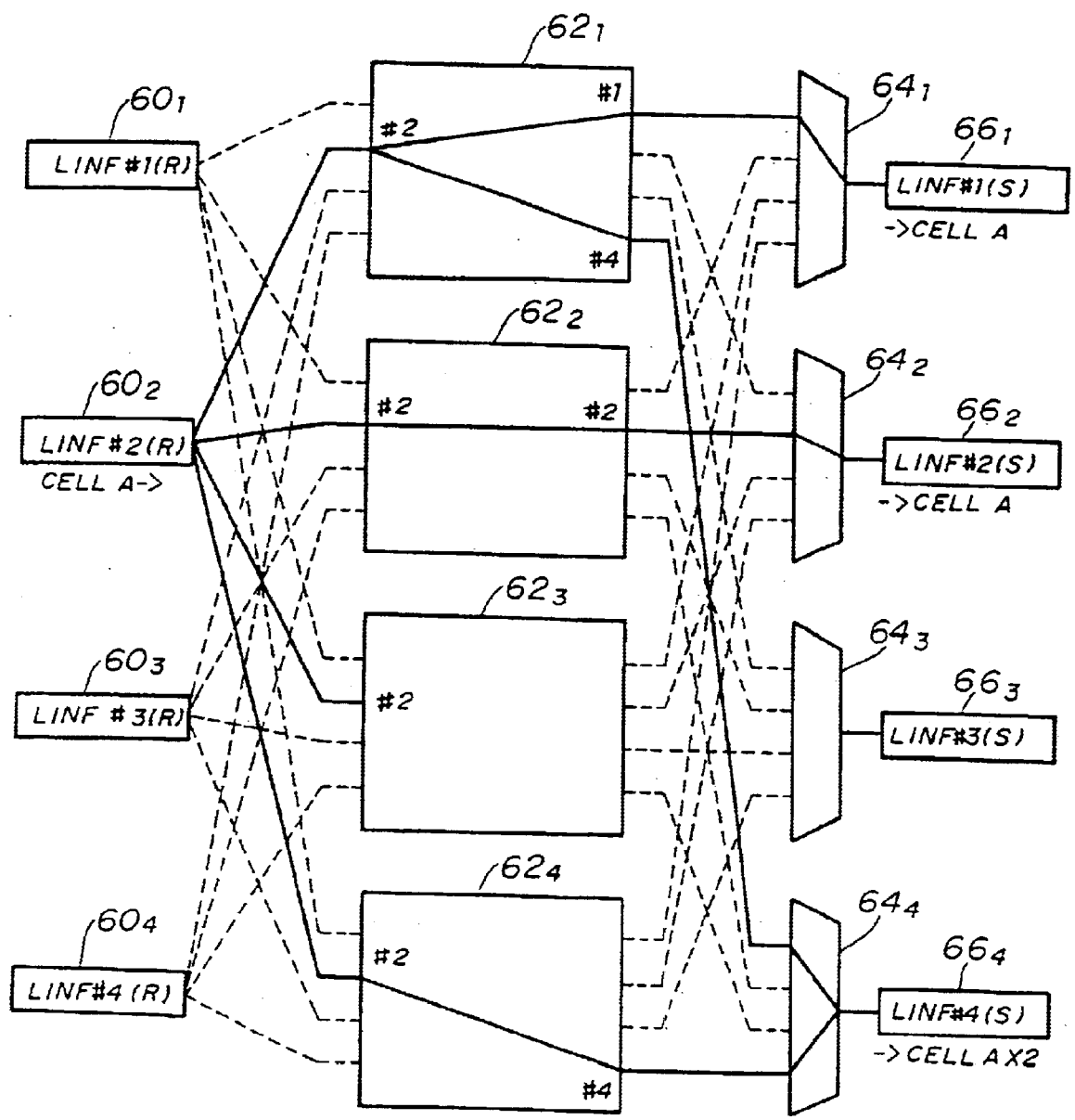
FIG. 13 is a block diagram showing a routing carried out in the embodiment of the present invention.

Referring to FIG. 13, the tag is added to the ATM cell A applied to the line interface $60_2$. Then, the ATM cell A is supplied to the input highways #2 of the MSSR switches $62_1$–624 from the line interface $60_2$. It will now be assumed that the tag added to the ATM cell A has the following information. The ID numbers CP1 and CP4 for the MSSR switch $62_1$ (SW#1 are equal to 1, and CP2 and CP3 are equal to 0. The ID number CP2 for the MSSR switch $62_2$ (SW#2 is equal to 1, and CP1, CP3 and CP4 are equal to 0. All the ID numbers CP1, CP2, CP3 and CP4 for the MSSR switch $62_3$ (SW#3 are equal to 0. The ID number CP4 for the MSSR switch $62_4$ (SW#4 is equal to 1, and CP1, CP2 and CP3 are equal to 0.

In the above assumption, the MSSR switch $62_1$ operates so that the ATM cell A is supplied to the multiplexers $64_1$ and $64_4$ from the output highways #1 and #4having the ID numbers of 1 defined in the tag. In the MSSR switch $62_2$, the ATM cell A is supplied to the multiplexer $64_2$b from the output highway #2 having the ID number of 1 defined in the tag. In the MSSR switch $62_3$, the ATM cell A is not supplied from any of the output highways because all the ID numbers defined in the tag are 0. In the MSSR switch $62_4$, the ATM cell is supplied to the multiplexer $64_4$ from the output highway #4having the ID number of 1 defined in the tag.

In the multiplexers $64_1$ and $64_2$, the supplied ATM cells A are sent to the output highways via the line interfaces $66_1$ and $66_2$. In the multiplexer $64_4$, the supplied ATM cells A supplied from the MSSR switches $62_1$ and $62_4$ are multiplexed and sent to the output highway via the line interface $66_4$.

Hence, one ATM cell A can be sent to a plurality of output highways, and a plurality of ATM cells having the same payload as each other can be sent to one output highway. The delays of the ATM cells distributed to the output highways are almost the same as each other, and the delays caused when multiplexing the ATM cells in the multiplexers $64_1$–$64_4$ are small. Hence, the differences among the delays of the ATM cells output via the line interfaces $66_1$–$66_4$ are negligible. Further, the above-mentioned embodiment of the present invention does not utilize the distribution trunk DTRK and thus does not utilize the table memories. Hence, it is possible to prevent the whole ATM switch from having an increased size.

Figure 14:
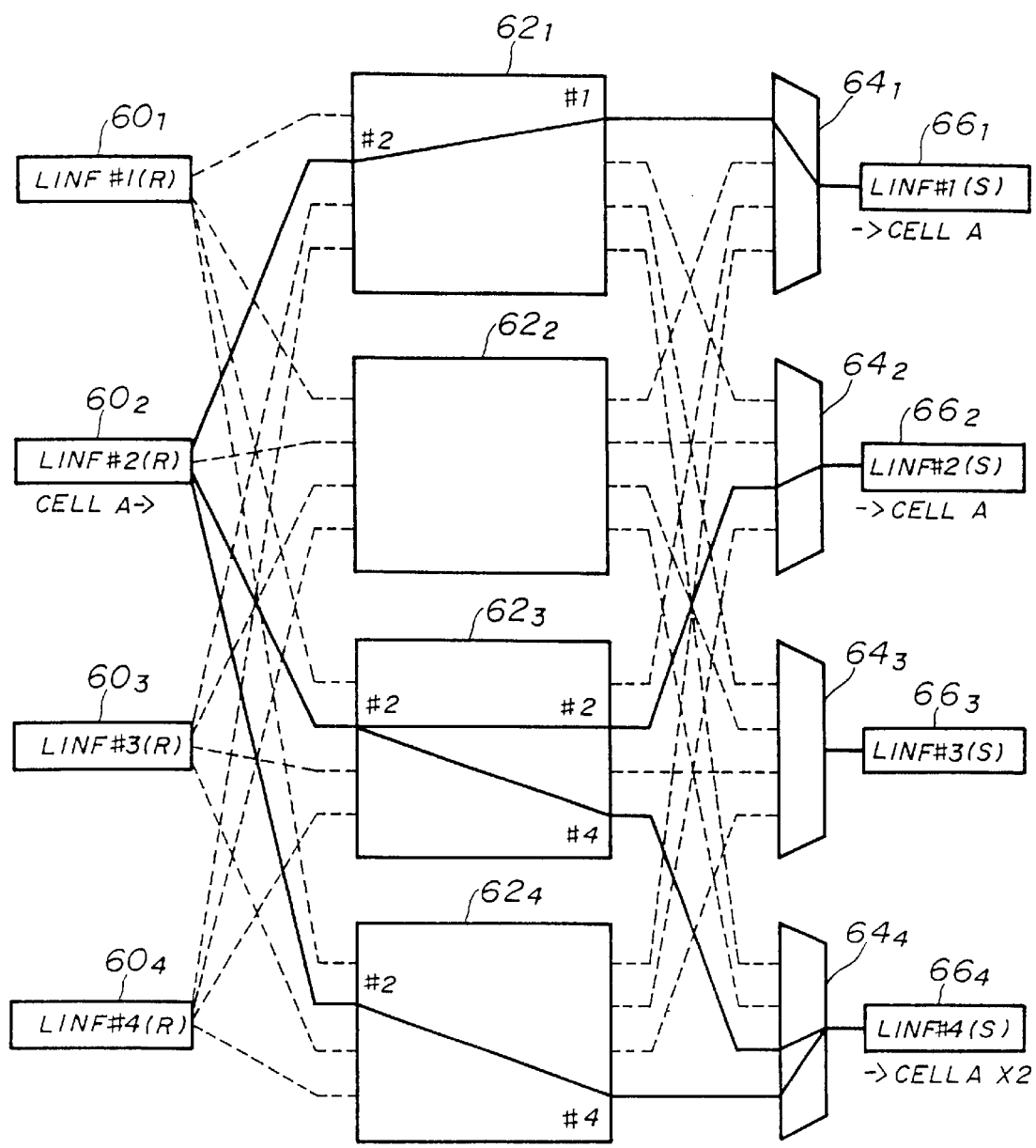
FIG. 14 is a block diagram showing another routing carried out in the embodiment of the present invention.

Referring to FIG. 14, the tag is added to the ATM cell A arriving at the line interface $60_2$, and then the ATM cell A is supplied from the line interface $60_2$ to the input highways #2 of the MSSR switches $62_1$–$62_4$. It will now be assumed that the tag added to the ATM cell A has the following information. The ID number CP1 for the MSSR switch $62_1$ (SW#1 is equal to 1, and CP2, CP3 and CP4 are equal to 0. All the ID numbers CP1, CP2, CP3 and CP4 for the MSSR switch $62_2$ (SW#2 are equal to 0. The ID numbers CP2 and CP4 for the MSSR switch $62_3$ (SW#3) are equal to 1, and CP1 and CP3 are equal to 0. The ID number CP4 for the MSSR switch $62_4$ (SW#4) is equal to 1, and CP1, CP2 and CP3 are equal to 0.

In the above assumption, the MSSR switch $62_1$ operates so that the ATM cell A is supplied to the multiplexer $64_1$ from the output highway #1 having the ID number of 1 defined in the tag. In the MSSR switch $62_2$, no ATM cells are output via the output highways #2 because all the ID numbers are equal to 0. In the MSSR switch $62_3$, the ATM cells A are supplied to the multiplexers $64_2$ and $64_4$ from the output highways #2 and #4 having the ID numbers of 1 defined in the tag. In the MSSR switch $62_4$, the ATM cell A is supplied to the multiplexer $64_4$ from the output highway #4 having the ID number of 1 defined in the tag.

In the multiplexers $64_1$ and $64_2$, the supplied ATM cells A are output to the respective output highways via the line interfaces $66_1$ and $66_2$. In the multiplexer $64_4$, the ATM cells A supplied from the MSSR switches $62_3$ and $62_4$ are multiplexed and are then output to the output highway via the line interface $66_4$.

The routing of the ATM cells A shown in FIG. 14 is different from the routing shown in FIG. 13 although the ATM cells shown in FIG. 14 are finally sent to the same output highways as those shown in FIG. 13. Hence, the MSSR switches $62_1$, $62_2$ and $62_4$ can be used as work systems, and the MSSR switch $62_3$ can be used as a protection system. If a problem occurs in one of the MSSR switches $62_1$, $62_2$ and $62_4$, the MSSR switch $62_3$ can be switched to the work system.

In order to realize the above switching from the protection system to the work system, the field of four bits out of the two-octet tag of the ATM cell referred to by the MSSR switches $62_1$–$62_4$ is not fixedly used but the field within the tag to be referred to is dynamically assigned by the central controller. Then, the MSSR switches $62_1$–$62_4$ are notified of the assigned field by the central controller. For example, if a problem occurs in the MSSR switch $62_2$ in a case where the four lower bits of the first octet of the tag and the four upper bits of the second octet thereof are respectively referred to by the MSSR switches $62_2$ and $62_3$ in the normal state, the central controller controls the MSSR switches $62_2$ and $62_3$ to refer to the four upper bits of the second octet of the tag and the four lower bits of the first octet thereof. Hence, the routing operation of the defective MSSR switch $62_2$ can be realized by another MSSR switch without any modification.

The present invention is not limited to the specifically disclosed embodiments, and variations and modifications may be made without departing from the scope of the present invention.

What is claimed is:

1. An ATM switch comprising:
   routing modules in each of which modules an ATM cell can be switched at crosspoints of inputs and outputs;
   input units which are respectively provided to input highways add a plurality of tags to the ATM cell transferred over the input highways and provide the ATM cell with the plurality of tags for routing modules, wherein one of the plurality of tags is used to switch the ATM cell in the routing module corresponding to each tag; and
   output units which are respectively provided to output highways and multiplex ATM cells supplied from the routing modules to output the ATM cells to the output highways, wherein a configuration is made such that the ATM cell provided from a single input highway is copied, and the plurality of ATM cells obtained from the copying operation are output to a single output highway.

2. The ATM switch as claimed in claim 1, wherein each of the routing modules has a structure in which an ATM cell arrives at one of the inputs can be switched to any of the outputs.

3. The ATM switch as claimed in claim 1, wherein the routing modules refer to predetermined fixed fields of the tags for routing.

4. The ATM switch as claimed in claim 1, wherein a routing carried out by one of the routing modules can be realized by another one of the routing modules.

5. The ATM switch as claimed in claim 1, wherein the routing modules refer to dynamically assigned fields of the tags for routing so that a routing carried out by one of the routing modules can be realized by another one of the routing modules.

* * * * *